United States Patent [19]

Caputo

[11] 3,838,398

[45] Sept. 24, 1974

[54] MAINTENANCE CONTROL ARRANGEMENT EMPLOYING DATA LINES FOR TRANSMITTING CONTROL SIGNALS TO EFFECT MAINTENANCE FUNCTIONS

[75] Inventor: James P. Caputo, Elmwood Park, Ill.

[73] Assignee: GTE Automatic Electric Laboratories Incorporated, Northlake, Ill.

[22] Filed: June 15, 1973

[21] Appl. No.: 370,277

[52] U.S. Cl. .......................... 340/172.5, 235/153 R
[51] Int. Cl. ............................................ G06f 11/00
[58] Field of Search ....... 340/172.5, 146.1; 235/153

[56] References Cited

UNITED STATES PATENTS

| | | | |
|---|---|---|---|
| 3,497,685 | 2/1970 | Stafford et al. | 235/153 |
| 3,568,153 | 3/1971 | Kurtz et al. | 340/146.1 |
| 3,573,728 | 4/1971 | Kolankowsky et al. | 340/146.1 |
| 3,646,519 | 2/1972 | Wollum et al. | 340/172.5 |
| 3,693,153 | 9/1972 | Rosenfeld | 340/146.1 |
| 3,713,095 | 1/1923 | McPherson | 340/146.1 |
| 3,736,566 | 5/1973 | Anderson et al. | 340/172.5 |
| 3,737,637 | 6/1973 | Frankeny et al. | 235/153 |

*Primary Examiner*—Gareth D. Shaw
*Assistant Examiner*—Mark Edward Nusbaum
*Attorney, Agent, or Firm*—Bernard L. Kleinke

[57] ABSTRACT

A maintenance control arrangement for use with a communication switching system having a central processor and a register sender interconnected by a data bus includes a maintenance circuit having direct control latch circuits and gate circuits operable when enabled to provide control signals for controlling apparatus associated with the register sender. A register sender memory stores direct control data bits which indicate which of the direct control latch and gate circuits are to be enabled and a control pulse directive transmitted over the data bus from the central processor to the maintenance circuit effects the generation of enabling signals which upon coincidence with direct control data bits read out of the register sender memory cause selective ones of the direct control latch and gate circuits to be enabled.

7 Claims, 6 Drawing Figures

FIG. 4

DATA LEADS

| CPD | RSD-A | | | | | RSD-B | | | |
|---|---|---|---|---|---|---|---|---|---|
| | 0 | 1 | 6 | 7 | | 0 | 1 | 6 | 7 |
| 101 | 1 | 0 | 1 | 0 | | 1 | 0 | 1 | 0 |
| 102 | 0 | 1 | 1 | 0 | | 0 | 1 | 1 | 0 |
| 103 | 1 | 1 | 1 | 0 | | 1 | 1 | 1 | 0 |
| 201 | 1 | 0 | 0 | 1 | | 1 | 0 | 0 | 1 |
| 202 | 0 | 1 | 0 | 1 | | 0 | 1 | 0 | 1 |
| 203 | 1 | 1 | 0 | 1 | | 1 | 1 | 0 | 1 |

FIG. 5A

RS MEMORY LAYOUT

| ADDRESS | DATA |
|---|---|
| Z0-Z191 | NORMAL CALL PROCESSING |
| Z192-Z201 | MAINTENANCE |
| Z202 | MISC. DATA WORDS |
| Z203 | SNAPSHOT |
| Z204 Z255 | SPARE |

FIG. 5B

RS MEMORY LAYOUT Z201

WORD 5B

| L | | | | K | | | | J | | | | I | | | | H | | | | G | | | |
|---|---|---|---|---|---|---|---|---|---|---|---|---|---|---|---|---|---|---|---|---|---|---|---|
| 4 | 3 | 2 | 1 | 4 | 3 | 2 | 1 | 4 | 3 | 2 | 1 | 4 | 3 | 2 | 1 | 4 | 3 | 2 | 1 | 4 | 3 | 2 | 1 |

WORD 5A

| F | | | | E | | | | D | | | | C | | | | B | | | | A | | | |
|---|---|---|---|---|---|---|---|---|---|---|---|---|---|---|---|---|---|---|---|---|---|---|---|
| 4 | 3 | 2 | 1 | 4 | 3 | 2 | 1 | 4 | 3 | 2 | 1 | 4 | 3 | 2 | 1 | 4 | 3 | 2 | 1 | 4 | 3 | 2 | 1 |

MAINTENANCE CONTROL ARRANGEMENT EMPLOYING DATA LINES FOR TRANSMITTING CONTROL SIGNALS TO EFFECT MAINTENANCE FUNCTIONS

BACKGROUND OF THE INVENTION

1. Field of the Invention

The present invention relates to a maintenance control arrangement for a communication switching system and more particularly to a maintenance arrangement in which maintenance control signals generated by a central processor are transmitted to a maintenance circuit over an existing data bus.

2. Description of the Prior Art

In communication switching systems employing a data processing unit, maintenance functions are generally controlled by a central processor which is responsive to malfunction indicating signals provided by the subsystems, such as a register sender. Control pulse directives are transmitted from the processor to the register sender to determine the source of the malfunction. Such malfunction, for example, may be indicated as the result of a register junctor which is not operating properly. In such case, it is desirable to remove such malfunctioning register junctor from service until the register junctor can be restored to a normal operating condition.

Accordingly, the central processor provides a disconnect signal over a maintenance lead connected between the central processor and the register junctor, or frequently a group of register junctors, to place temporarily such register junctor out of service. However, for the register-sender subsystem alone, a large number of maintenance wires must be connected between the central processor and the various apparatus controlled by the register-sender, such as register junctors for maintenance purposes only. It would be desirable to minimize the number of conductors required for maintenance purposes in a communication switching system.

SUMMARY OF THE INVENTION

The principal object of the invention is to provide a new and improved maintenance control arrangement for a communication switching system wherein maintenance control functions are effected by the transmission of maintenance control signals over existing data buses.

According to the invention, a maintenance control arrangement for a communication switching system having a central processor for controlling a plurality of subsystems controlled by the central processor includes a maintenance circuit associated with at least one of the subsystems and having direct control logic circuits each individually associated with a different apparatus of the subsystem to be controlled. In an exemplary embodiment, the subassembly may be the register-sender of the communication system. The register-sender includes register apparatus including memory means, logic circuit means and register junctor means arranged on a time division multiplex basis for storing information in response to recurring pulses each defining a different time slot. A data bus connected between the register sender and the central processor permits the transmission of data therebetween.

In accordance with the invention, certain functions of register-sender maintenance hardware can be directly controlled by outputs of the central processor both by altering bits of words stored in the memory means and through the use of control pulse directives which are transmitted to the register-sender over the data bus. For example, to place a given register junctor temporarily out of service, the central processor will effect the storage of a data bit in a predetermined bit location of the memory means which is assigned to a direct control logic circuit corresponding to such register junctor. Thereafter, the central processor will supply a control pulse directive to the maintenance circuit over the data bus to effect the generation of an enabling signal for the direct control logic circuits during a predetermined time slot. During such time slot, the contents of the memory means including the maintenance data bits are read out causing the direct control logic circuit associated with the register junctor to be enabled to provide a control signal for effecting the disconnection of the register junctor.

A feature of the invention is that the direct control logic circuits may include a plurality of latch circuits for controlling certain register-sender maintenance hardware and a plurality of gate circuits for controlling the functions of certain other maintenance hardward of the register-sender. In addition, the central processor is operable to provide either first or second control pulse directives to effect enabling of either the latch circuits or the gate circuits in accordance with maintenance bits stored in the memory means.

CROSS-REFERENCES TO RELATED PATENT APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. patent application Ser. No. 130,133 filed Apr. 1, 1971, by K. E. Prescher, R. E. Schauer and F. B. Sikorski, and a continuation-in-part thereof Ser. No. 342,323 filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480 filed May 3, 1971, now U.S. Pat. No. 3,729,715 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851 filed Nov. 24, 1971, now U.S. Pat. No. 3,737,873 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909 by J. P. Caputo and F. A. Weber for a DATA HANDLING SYSTEM ERROR AND FAULT DETECTING AND DISCRIMI- NATING MAINTENANCE ARRANGEMENT, Ser. No. 270,910 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912 by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,682,537, issued Aug. 1, 1972, by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972, by J. W. Eddy for an INTERLOCK ARRANGEMENT FOR A COMMUNICATION SWITCHING SYSTEM, Ser. No. 311,606 filed Dec. 4, 1972, by J. W. Eddy and S. E. Puccini for a COMMUNICATION SYSTEM CONTROL TRANSFER ARRANGEMENT, Ser. No. 303,157 filed Nov. 2, 1972, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. patent application Ser. No. 347,281 filed Apr. 2, 1973 by Kalat et al. for a stored program control in a communication switching system. hereinafter referred to as the EXECUTIVE PROGRAM patent application.

The computer third party circuit is disclosed in United States patent application Ser. No. 348,575 filed Apr. 6, 1973 for a "DATA PROCESSOR SYSTEM DIAGNOSTIC ARRANGEMENT" by L. V. Jones et al. hereinafter referred to as the THIRD PARTY patent application.

DESCRIPTION OF THE DRAWINGS

FIG. 4 is a truth table indicating bit conditions for control pulse directives employed by the central processor for controlling the maintenance unit shown in FIG. 1; and FIG. 5 comprising FIGS. 5A and 5B illustrate the arrangement of information in the memory of the register-sender subsystem.

DESCRIPTION OF THE PREFERRED EMBODIMENTS

Figure 1:
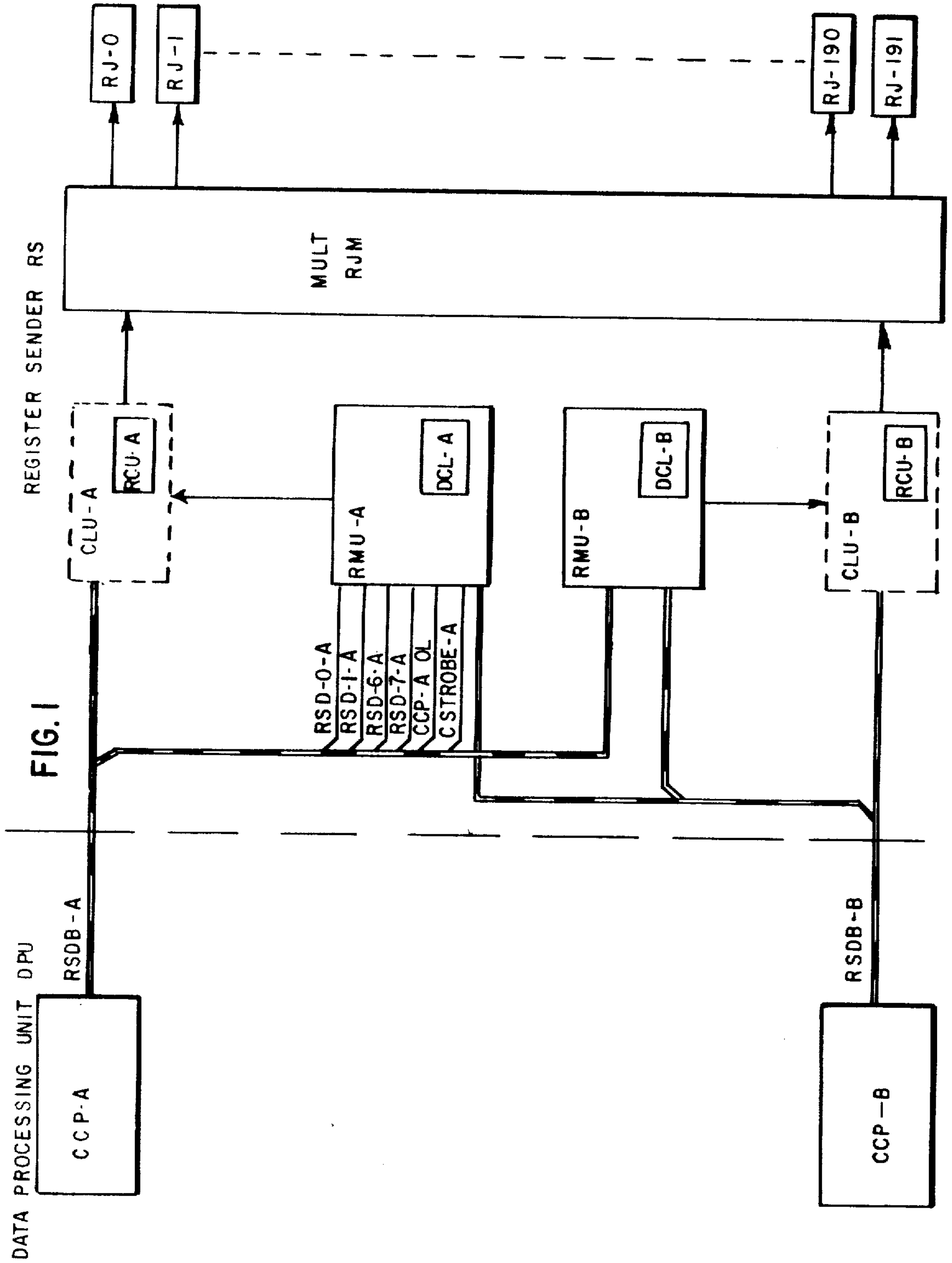
FIG. 1 is a block diagram of a data processing unit and register-sender including a register maintenance unit provided in accordance with the present invention.

Referring to FIG. 1, there is shown a simplified block diagram of a data processing unit DPU and a register-sender RS. The data processing unit includes duplicated central processors CCP–A and CCP–B. The register sender RS has two identical common logic units CLU–A and CLU–B and each common logic unit CLU has an associated register-sender core memory RCM–A and RCM–B, CLU–A and CLU–B, respectively. In addition, each register-sender RS has an associated maintenance control unit, RMU–A, RMU–B, each of which provides control signals for an associated common logic unit CLU–A, CLU–B, respectively. Each register-sender RS also has its own multiplex equipment and space divided hardware, such as register junctors RJ–O, RJ–1, . . . RJ–90, RJ–191, for example. The space divided hardware is electromechanical in nature, and accordingly, the register-junctor multiplex circuit RJM provides the interface between the space divided electromechanical hardware and the logic circuits of the common logic units CLU–A and CLU–B. Logic unit CLU–A is connected to central processor CCP–A over a data bus RS DB–A and common logic unit CLU–B is connected to central processor CCP–B over a data bus RSDB–B. In addition, as will be shown hereinafter, lines RSDO–A, RSD1–A, RSD 6–A, RSD 7–A, CCP–A ONLINE and C STROBE–A of data bus RSDB–A are extended to maintenance units RMU–A and RMU–B and corresponding lines of data bus RSDB–B are extended to maintenance units RMU–B and RMU–A.

Each register maintenance unit RMU, such as unit RMU–A includes direct control logic DCL such as logic circuits DCL–A and DCL–B for maintenance units RMU–A and RMU–B. Further circuits of the register maintenance units RMU–A and RMU–B are disclosed in more detail in the REGISTER-SENDER MAINTENANCE patent application referenced above.

Figure 2:
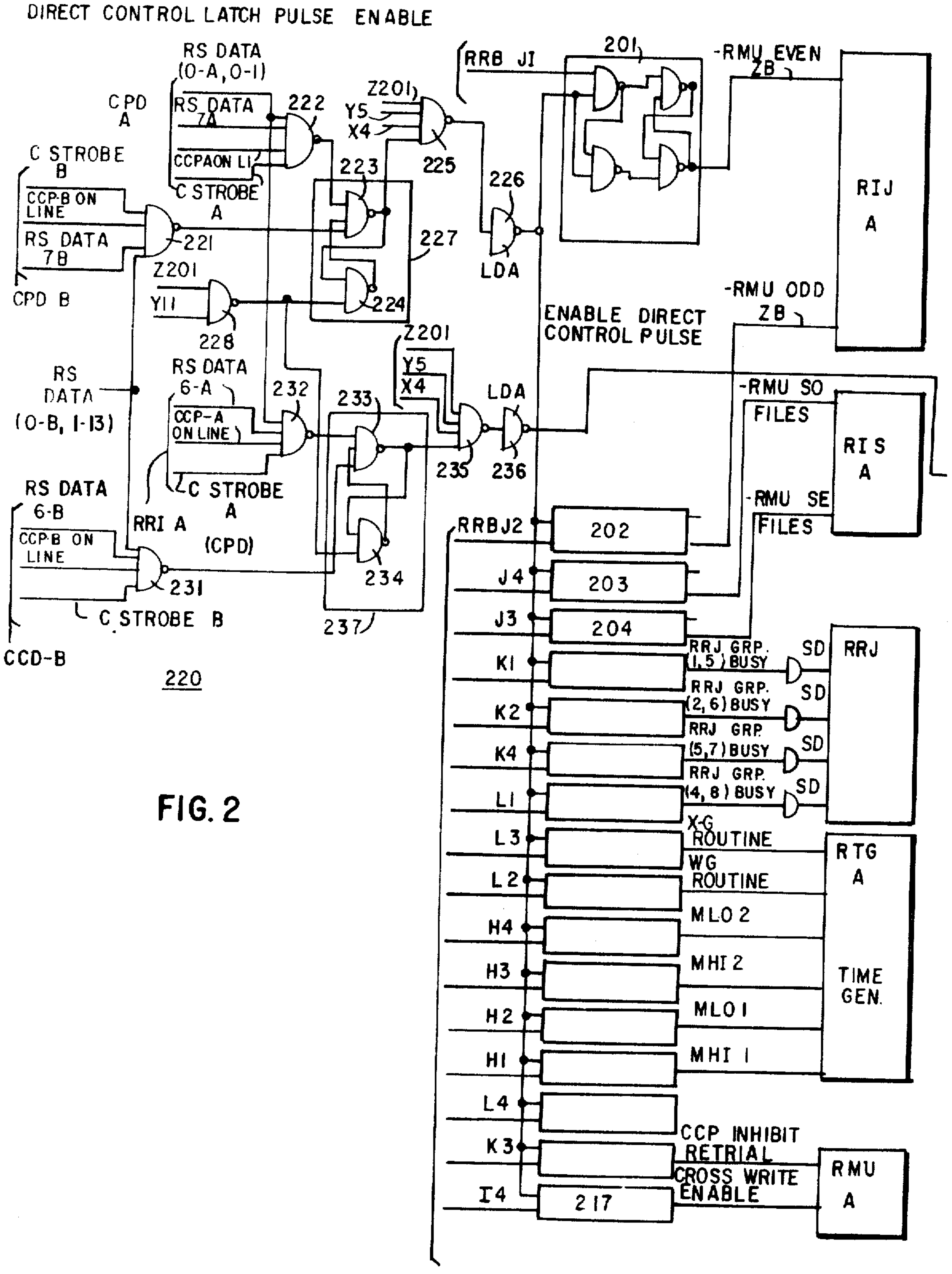
FIGS. 2 and 3 when arranged in side by side relationship show a block diagram of direct control logic circuits of the maintenance unit shown in FIG. 1.
Figure 3:
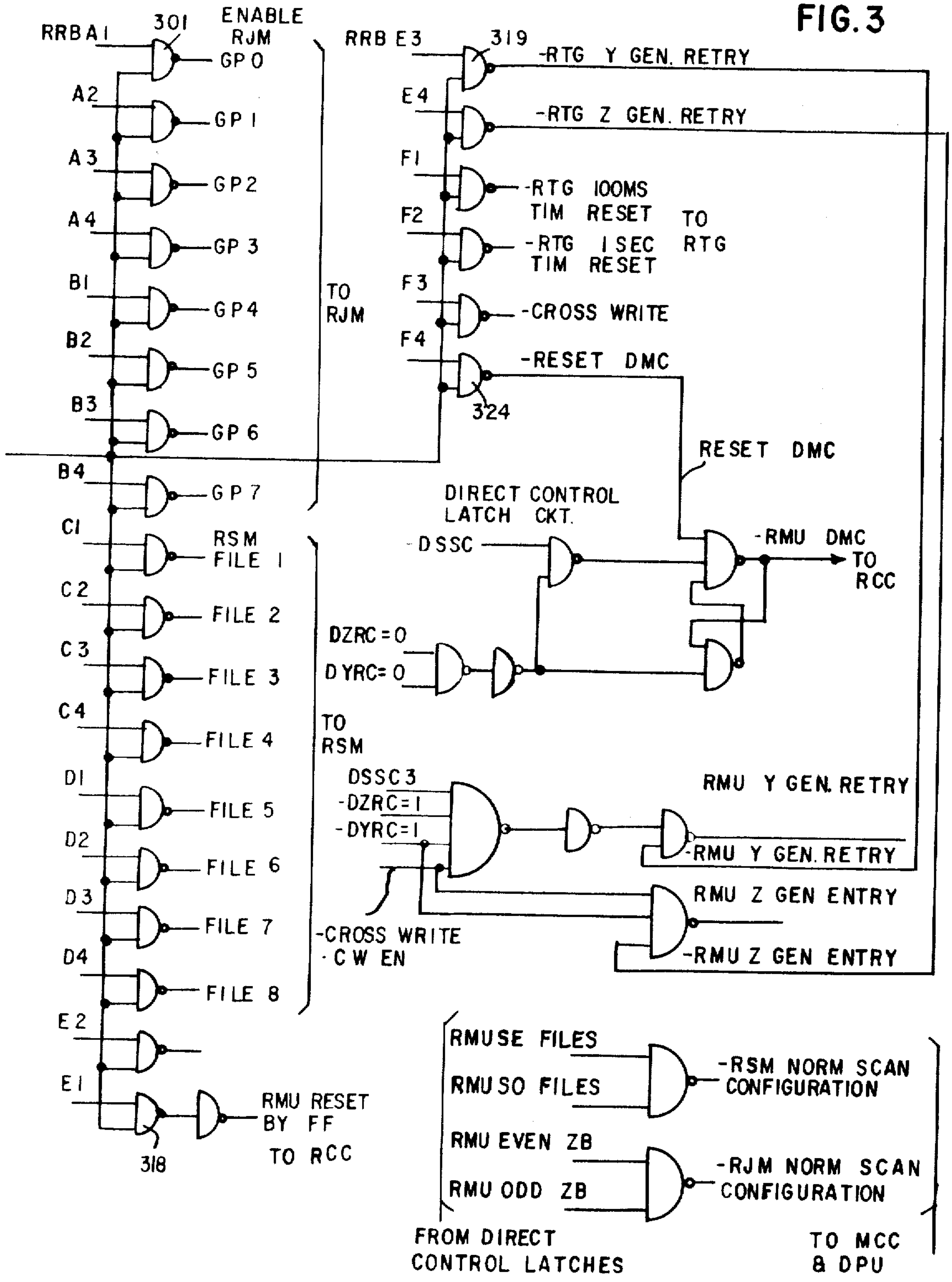

The direct control logic circuits DCL–A are shown in block diagram form in FIGS. 2 and 3 when arranged in side by side relationship. In considering the direct control logic circuit DCL, the "A" circuits will now be described in detail, it being understood that the "B" units are identical to the "A" units. The direct control logic circuits DCL–A include a plurality of latch circuits 201–217 each of which is individually associated with certain register-sender maintenance hardware, such as register junctor interface circuits RIJ–A, register-sender interface circuits RIS–A, register junctors RRJ, register timing generator circuits RTG–A, and a register-sender main control unit RMU–A. It is pointed out that the register junctor interface RIJ–A, register-sender interface RIF–A, register timing generator circuit RTG–A, and register sender main control unit RMU–A are duplicated, and accordingly, similar hardware apparatus would be controlled by the direct control logic circuits DCL–B in register maintenance unit RMU–B. The register junctors RRJ, on the other hand, are divided into eight groups of 24 register junctors, groups 1–4 being controlled by maintenance unit RMU–A and groups 5–8 being controlled by maintenance unit RMU–B.

Referring to FIG. 3, the direct control logic circuits DCL–A further include a plurality of pulse gates 301–324 which are operable when enabled to provide pulse outputs for controlling logic circuits of the logic unit CLU–A, the register junctor multiplex RJM, a register-sender multiplex RSM.

Certain functions of the register-sender maintenance hardware are directly controlled by outputs of the data processing unit DPU both by altering data stored in the register-sender memory RCM–A and by the use of control pulse directives provided by the central processor CCP–A. The central processor CCP–A effects the enabling of either the latch circuits 201–217 or the gate circuits 301–324 in either maintenance unit RMU–A or maintenance unit RMU–B, or both, by supplying control pulse directives which are received over a direct control latch pulse enable circuit 220. The enable circuit 220 includes gates 221–226 which provide an enabling signal for latch circuits 201–217. The enable circuit 220 further includes gates 231–236 which provide an enabling signal for the pulse gates 301–324. A first control pulse directive CPD–101 enables the generation of pulses in unit CLU–A. A second control pulse directive CPD–102 enables the generation of pulses in unit CLU–B. A third control pulse directive CPD–103 enables the generation of pulses in both units CLU.

Control pulse directive CPD–201 enables the setting or resetting of latches 201–217 in unit CLU–A. A control pulse directive CPD–202 enables setting or resetting of such latches in unit CLU–B, and a control pulse directive CPD–203 enables the setting or resetting of latches of both units CLU.

Referring to FIG. 2, the inputs supplied to the control latch-pulse enable circuit 220 of maintenance unit RMU–A from central processor CCP–A include data lines O–A, RSD 1–A, RSD 6–A, and RSD 7–A, CCP ON LINE-A and C STROBE-A. Similarly, the central processor CCP–B supplies signals over data lines RSD O–B, RSD 1–B, RSD 6–B and RSD 7–B in addition to CCP–B ON LINE and C STROBE-B.

A truth table, FIG. 4, indicates the bit conditions for data bits RSD O–A, RSD 1–A, RSD 6–A, RSD 7–A, and RSD 0–B, RSD 1–B, RSD 6–B and RSD 7–B, for the six control pulse directives CPD (101–103) and CPD (201–203). Specifically, data bits RSD 6–A, 6–B are true whenever the latch circuits 201–217 are to be enabled and data bits RSD 7–A and 7–B are true whenever the pulse gates 301–324 are to be enabled. Moreover, data bits RSD 0–A, 0–B are true whenever the latch circuits 201–217 or gate circuits 301–324 of maintenance unit RMU–A are to be enabled and data bits RSD 1–A, 1–B are true whenever the latch circuits 201–217 or pulse gates 301–324 of maintenance units RMU–B are to be enabled. Also, when the latch circuits 201–217 or the gate circuits 301–324 are to be enabled in both maintenance units RMU–A, RMU–B, data bits RSD (O–A, 1–A), and RSD (O–B, 1–B) are true.

Signal inputs RS D (O–A, 0–1), RS D 7–A, CPP–ON LINE, and C STROBE-A are supplied to gates 222 and inputs RS D (O–A–O1), RS D O–A, CCP–A ON LINE and C STROBE-A are supplied to gate 232. Inputs RS D (O–B, 1–B), RS D 7–B, CCP–B ON LINE, and C STROBE-B are supplied to inputs of gate 221 and signals RSD (O–B, 1–B), RSD 6–B, CCP–B ON LINE, and C STROBE-B are supplied to inputs of gate 231. Gate 222 controls the setting of a latch circuit 227 comprised of gates 223 and 224. The output of latch circuit 227 controls the enabling of gate 225 when timing pulses Z201, Y1, and X4 are generated by a register-sender timing generator RTG, as described in the REGISTER SENDER MEMORY CONTROL patent application. The output of gate 225 is extended over an inverter 226 to provide an enabling signal for the latch circuits 201–217.

Gate 232 controls the enabling of a further latch circuit 237 comprised of gates 233 and 234. Latch circuit 237 in turn controls the enabling of gate 235 when timing pulses Z201, Y1, and X4, are extended to inputs of gate 235. The output of gate 235 is extended over an inverter 236 to pulse gates 301–324 to provide an enabling signal for gates 301–324.

The latch circuits 201–217 and pulse gates 301–324 each receive a further enabling input from the register-sender memory RCM–A. Referring to FIG. 5A, there is shown a schematic representation of the register-sender memory layout. As described in the REGISTER-SENDER MEMORY CONTROL patent application, the register-sender memory RCM is divided into 255 blocks each having a "Z" address. Each block is further subdivided into eight rows, each row having two words.

Each register-sender time slot is known as a "Z" time, and the register-sender RS employs time slots Z–0 through Z–203 all of which occur sequentially during a 10 millisecond register-sender memory scan cycle. The first 192 blocks ZO–Z191 have a one-for-one fixed assignment to 192 space-divided register junctor circuits which may be equipped in a register-sender. Blocks Z192–Z201 are used to store maintenance data, block Z202 is used to store miscellaneous data words and block Z203 is used to store SNAP-SHOT data.

Each "Z" time is normally divided into nine intervals to allow successive appearances of nine out of eleven possible "Y" times which are numbered Y1 to Y11. Each time Y represents operation of the register-sender RS on a pair of memory words within a register junctor RJ memory block. Each time Y is further divided into five "X" times numbered X1 to X5. During times X1 and X2 the register-sender RS successively reads two 26-bit words from the register-sender memory RCM into a 52-bit register buffer (not shown). The combined contents of the register buffer are referred to as a row. During time X3, of a given time Z, the call processing circuitry of the register-sender common logic CLU acts on the contents of the register buffer and on information from space-divided equipment associated with the call being serviced by the common logic unit CLU during such time A.

During time X3, the memory RCM can be used for other purposes, including access by the data processing unit DPU, depending upon the particular time Y. During time Y1–X3, the register-sender always writes the register junctor scan position word in memory block Z202. This data is used by call processing software to prevent interference which may arise by both the register-sender RS and call processing software simultaneously altering the data within as is described in the REGISTER-SENDER MEMORY CONTROL patent application, if a given register junctor "Z" slot. The register-sender RS is serving or is about to serve the "Z" slot that the processor CCP is attempting, to access, software delays such access until the register-sender RS is finished with that register junctor slot. Times X4 and X5 are used by the register-sender RS.

As indicated above, each block of data storage locations includes eight rows, each having two data words. The layout for words 5A and 5B of Z slot Z201 are shown in FIG. 5B. The slot Z201 is employed by the register junctor maintenance unit RMU to control the latch circuits 201–217 and pulse gates 301–324. The data words 5A and 5B are directly associated with the pulse and latch assignments, the letter-number designation for each assignment referring to the bit position in the fifth row of the memory RCM. The pulse and latch assignments are listed in Tables I and II, respectively.

TABLE I

Direct Control Pulse Assignments (by bit position)

| | |
|---|---|
| A1: | Enable multiplex RJM Group 0<br>If this is executed in unit CLU–A, Group 0 of the multiplex RJM is configured to unit CLU–A, or conversely for unit CLU–B. The multiplex RJM Common Group enable pulse (F1) must also be specified. |
| A2: | Enable multiplex RJM Group 1<br>As A1 Except for multiplex RJM Group 1 |
| A3: | Enable multiplex RJM Group 2<br>As A1 except for RJM Group 2 |
| A4: | Enable multiplex RJM Group 3<br>As A1 except for multiplex RJM Group 3 |
| B1: | Enable multiplex RJM Group 4<br>As A1 except for multiplex RJM Group 4 |
| B2: | Enable multiplex RJM Group 5<br>As A1 except for multiplex RJM Group 5 |
| B3: | Enable multiplex RJM Group 6<br>As A1 except for multiplex RJM Group 6 |
| B4: | Enable multiplex RJM Group 7<br>As A1 except for multiplex RJM Group 7 |
| C1: | Enable multiplex RSM File 1<br>If this is executed in unit CLU–A, file 1 of the multiplex RSM is configured to unit CLU–A, or conversely for unit CLU–B. The multiplex RSM Common Group Enable pulse (F2) must also be specified. |
| C2: | Enable multiplex File RSM 2<br>As C1 except for file RSM 2 |
| C3: | Enable multiplex File RSM 3<br>As C1 except for file RSM 3 |
| C4: | Enable multiplex File RSM4<br>As C1 except for file RSM 4 |
| D1: | Enable multiplex File RSM 5<br>As C1 except for file RSM 5 |
| D2: | Enable multiplex File RSM 6<br>As C1 except for file RSM 6 |
| D3: | Enable multiplex File RSM 7<br>As C1 Except for file RSM 7 |
| D4: | Enable multiplex File RSM 8<br>As C1 Except for file RSM 8 |
| E1: | Reset Flip-Flop BY in RS carry buffer RCB<br>Resets the Flip-Flop BY (S/R assignment function BUSY) Flip-Flop BY which normally is set when the central control RCC is in process of connecting a sender or receiver to a Register Junctor RJ. |
| E2: | Unassigned |
| E3: | Processor CCP inhibit retrial Latch<br>When this latch is set, the unit RMU initiates a Fault Interrupt on the initial detection of a malfunction rather than initiate a retrial. This latch is automatically reset from the unit RMU after the next snapshop is taken. |
| E4: | Set latch DMC in unit RMU<br>This pulse is used to set the Disable Matrix Connection latch DMC in the unit RMU. The latch DMC when set prevents the unit CLU within which it is set from initiating a S/R matrix connection. |
| F1: | Multiplex RJM Common Group Enable<br>This pulse enables the eight multiplex RJM reconfiguration pulses. |
| F2: | Multiplex RSM Common Group Enable<br>This pulse enables the eight multiplex RSM reconfiguration pulses. |
| F3: | Cross Timing Generators RTG Reset.<br>This pulse is used to resync counters Y, Z, 100 MS, and 1 SEC in the timing generator RGT. This pulse resets the 100 MS and the 1 SEC counter in the unit CLU in which it is executed. If the latch Cross RTG Enable is set in the other unit CLU, all four counters will also be reset in that unit CLU at time Y1 in RRJ slot 0, therefore resyncing the two timing generators RTG. |
| F4: | Reset latch DMC in unit RMU. This pulse is used to reset the latch Disable Matrix Connection (DMC) in the unit RMU. |

TABLE I-Continued

TABLE II

Direct Control Latch Assignments (by bit position)

| | |
|---|---|
| G1 to G4: | Unassigned |
| H1: | System Clock Monitor High State 1<br>Used for clock routining. |
| H2: | System Clock Monotor Low State 1<br>See H1 |
| H3: | System Clock Monitor High State 2<br>See H1 |
| H4: | System Clock Monitor Low State 2<br>See H1 |
| I1 to I3: | Unassigned |
| I4: | Cross RTG RST Enable Latch<br>This latch enables the cross write reset function from the other unit CLU to reset the counters Y, Z, 100 MS, and 1 SEC in the timing generator RTG in order to sync the common logic units CLU–A, CLU–B. This enable is required in order to avoid a fault in one unit CLU affecting the other unit CLU. This latch must be set prior to executing the pulse Cross RTG RESET DIR. CON. in the other unit CLU. |
| J1: | Select Even multiplex RJM Groups<br>For the unit CLU within which this latch is set, scanned signals from the even-numbered multiplex RJM Groups (0,2,4, & 6) are gated into the central control logic. RCC. |
| J2: | Select Odd multiplex RJM Groups<br>As J1 except for Odd-numbered multiplex Groups RJM (1, 3, 5 & 7) |
| J3: | Select Even multiplex RSM Files<br>For the unit CLU within which this latch is set, scanned signals from the even numbered multiplex files RSM (2,4,6, & 8) are gated into the central control logic. RCC. |
| J4: | Select Odd multiplex RSM Files<br>As J3 except for odd-numbered files RSM (1, 3, 5 & 7) |
| K1: | Busy Out Register Junctor RRJ Group (0, 4)<br>Setting this latch in CLU–A forces Junctor RRJ Group O to appear busy to the Markers; setting it in unit CLU–B, junctor RRJ Group 4 appears busy. |
| K2: | Busy Out Register Junctor RRJ Group (1, 5)<br>As K1 except relates to junctor RRJ Groups 1 and 5. |
| K3: | Unassigned |
| K4: | Busy out Register Junctor RRJ Group (2, 6)<br>As K1 except relates to junctor RRJ Groups 2 and 6. |
| L1: | Busy Out Register Junctor RRJ Group (3, 7)<br>As K1 except relates to junctor RRJ Groups 3 and 7. |
| L2: | Routine W. Generator<br>This latch is used to routine error and fault detection circuitry of the W generator in the timing generator RTG. |
| L3: | Routine X Generator<br>As L2 except for X generator. |
| L4: | Unassigned |

The bit positions (TABLE I) corresponding to the pulses to be generated over pulse gates 301–324 are set to logic 1 and all other pulse associated bits are set to logic 0. Similarly, the bit positions (TABLE II) corresponding to preselected one of the latch circuits 201–217 which are to be set are set to logic 1 and the remaining latch associated bits are set to logic 0.

The setting of the direct control bits in words 5A and 5B of slot Z201 is controlled by the central processor CPU. For example, whenever it is desired to enable pulse gate 301, the central processor CPU effects the writing of a logic 1 bit in bit position A–1 of slot Z201 in the register sender memory RCM. The desired control pulse directive CPD–101, CPD–102 or CPD–103 is then generated when the register sender RS is in a time slot other than Z201.

During the next scan of the fifth row of memory slot Z201, the maintenance unit RMU generates a pulse over gate 301 corresponding to the logic "1" bit stored in bit position A–1 of slot Z201.

To set latch circuit 201, for example, the central processor CPU effects the writing of a logic 1 bit in bit position J–1 in the register sender memory RCM. The desired control pulse directive CPD–201, CPD–202 or CPD–203 in the generated when the register sender RS is in a time slot other than Z201.

During the next scan of the fifth row of memory slot Z201, latch circuit 201 is set and the maintenance unit RMU provides a control output to the register junctor interface RIJ.

The direct control latch-pulse enable circuit 220 further includes a reset gate 228 which is enabled by timing pulses Z201, Y11 to cause latch circuit 227, 237 of the enable circuit 220 to be reset at the end of each scan of memory slot Z201.

OPERATION OF DIRECT CONTROL LOGIC CIRCUITS

By way of illustration of the operation of the direct control logic circuits DCL it is assumed that it is desired to enable gate 301 (FIG. 3) in logic unit CLU–A to cause Group O of the register junctor multiplex RJM–A to be configured to control logic unit CLU–A. Accordingly, central processor units CCP–A and CCP–B each access corresponding register-sender memories RCM–A and RCM–B respectively to effect the writing in of a logic 1 bit in bit location A–1 in slots Z201. Prior to effecting the actual writing of the logic 1 bit into the register-sender memories RCM–A and RCM–B, the central processors CCP–A, CCP–B will first effect readout of the junctor scan position word in memory block Z202 to determine if there is sufficient time for central processors CCP–A, CCP–B to alter the contents of Z slot Z201 before such memory slot is scanned by the register-sender RS.

In the event that sufficient time is available to enable the central processors CCP–A and CCP–B to write the logic 1 bit in bit position A–1 of corresponding register-sender memories RCM–A and RCM–B, the central processors CCP–A and CCP–B will send appropriate address and data to the register-sender memories RCM–A and RCM–B to cause the writing of a logic 1 bit in bit position A1 of memories RCM–A and RCM–B.

Thereafter, prior to time slot Z201, the central processors CCP–A and CCP–B will send control pulse directive CPD–101 in the present example, to maintenance unit RMU–A over data buses RSDB–A and RSDB–B respectively, to effect the enabling of gate 301.

Referring to FIG. 2, upon receipt of control pulse directive CPD–101 transmitted by central processor CCP–A, gate 232 will be enabled in response to signals on RSD leads O–A and 6–A, CCP–A on line and C STROBE-A providing an enabling input for gate 233 of latch circuit 237. At the same time, gate 231 will be enabled by the control pulse directive CPD provided by central processor CCP–B by signals on RSD lines O–B and 6–B, and CCP–B ON LINE, and C STROBE-B providing a second enabling input for gate 233 of latch circuit 237. Accordingly, latch circuit 237 will be enabled providing an enabling input for gate 235.

When time Z201 is reached during the sequential memory scan cycle, words 5A and 5B will be read out into the register-sender memory buffer at times Y5, X1, and Y5, X2, respectively and stored in the memory buffer. Accordingly, after time Y5, X2 of time slot Z201, inputs are supplied to pulse gates 301–324 in accordance with the direct control bits read out of the memory RCM. In the present example, where a logic 1 bit has been stored in bit position A–1 of word 5 in slot Z201, an enabling input will be provided to gate 301 over input A1.

At time Z201, Y5, X4, gate 235 will be enabled extending an enable direct control pulse output over inverter 236 to second inputs of each of the gates 301–324. At such time, gate 301 will be enabled to provide a pulse output to Group O of the register junctor multiplex RJM. In addition, if logic 1 direct control logic bits have been supplied to any of the remaining gates 302–324 such gates will also be enabled to provide pulse outputs to associated apparatus.

At time Z201, Y5, X5, gate 235 will be disabled thereby disabling the pulse gates 301–324 terminating control pulses provided by one or more of the pulse gates 301–324. As the register-sender timing pulse generator RTYG continues to cycle, when time Z201, Y11 is reached, gate 228 will be enabled to effect reset of latch circuit 237.

While in the present example, it was assumed that control pulse CPD–101 was provided thereby effecting the enabling of gate 31 only in maintenance unit RMU–A, it is pointed out that a similar sequence of events would occur in the direct control logic DCL–B in the maintenance unit RMU–B or in both maintenance units RMU–A, RMU–B had control pulse directives CPD–102 or CPD–103; respectively been provided.

OPERATION OF DIRECT CONTROL LATCH ENABLE

To illustrate the operation of enabling of the direct control latch circuit 201–217, it is assumed that the central processor CCP through the use of maintenance or diagnostic software have determined that one of the register junctors in register junctor group 1 is malfunctioning and that it is desirable to temporarily place such group of register junctors out of service. Accordingly, the central processors CCP–A and CCP–B will access corresponding register-sender memories RCM–A and RCM–B respectively to determine if there is sufficient time to alter the data stored in slot Z201 of the register-sender memories RMU–A and RMU–B.

In the event that sufficient time is available, central processor units CCP–A and CCP–B will effect the writing of logic 1 bits in bit positions K1 for the fifth word in memory slot Z201.

Thereafter, prior to time Z201, the central processor unit CCP–A and CCP–B will send control pulse directive CPD–201 to both maintenance units RMU–A and RMU–B over corresponding register-sender data buses RSDB–A and RSDB–B, respectively. Referring to FIG. 2, upon receipt of control pulse directive CPD–201, gates 221 and 222 will be enabled to effect the setting of latch circuit 227 of the direct control latch pulse enable circuit 220. Gate 222 will be enabled by signals RSD O–A, RSD 7–A, CCP–A ON LINE and C STROBE-A provided by central processor CCP-14 A over data bus RSDB–A. Gate 221 will be enabled by signals RSD O–B, RSD 7–B, CCP–B ON LINE and C STROBE-B provided by central processor CCP–B over data bus RSDB–B. Latch circuit 227, when set, provides an enabling input for gate 225.

When the register-sender memory scan cycle reaches time slot Z201, data word 5A will be read out into the memory buffer register at time Z201, Y5, X1 and word 5B will be read out into further registers of the memory buffer during time Z201, Y5, X2, providing enabling inputs for the latch circuits 201–217. When timing signals Y5, X4 are generated during time slot Z201, gate 225 will be enabled providing an enable direct control latch signal over gate 226 to the latch circuits 201–217. Accordingly, in the present example, wherein an enabling input is provided on input K1 to latch circuit 205, latch circuit 205 will be set providing an output which is extended over gate SD to the register junctors RJ to cause register junctor group RRJ–1 to be busied out.

In addition, if any of the remaining latch circuits 201–204, 206–217 have logic 1 bits stored in associated bit locations in the fifth word of memory slot Z201, such latch circuits will also be set at this time. In addition, if the direct control bit for a latch circuit which was previously set is now written as a logic 0, such latch circuit will be reset when the enabling pulse is provided by the direct control latch pulse enable circuit 220.

The latch circuit 227 of the direct control latch pulse enable circuit 220 will be reset by an output of gate 228 provided at time Z201, Y11 at the end of time slot Z201.

I claim:

1. In a communication switching system including a data processing unit having a central processor means, a register-sender means, a memory means, means for reading out bits of stored information from said memory means, and register junctor means arranged on a time division multiplex basis for transferring information to said memory means during recurring pulses generated by a clock source, said pulses each defining a different time slot under control of a register multiplex unit, and a data bus connected between said central processor means and said register-sender means, a maintenance control arrangement comprising maintenance means including direct control logic means having a plurality of logic circuit means including logic circuit means individually connected to said register junctor means, and enable means connected to said clock source and responsive to a control pulse directive transmitted over said data bus from said central processor means to said direct control logic means for effecting the generation of an enabling signal for said logic circuit means of said direct control logic means during a predetermined time slot following the time slots associated with the register junctor means, said memory means having a plurality of data bit storage locations for storing direct control bits for indicating which of said logic circuit means of said direct control logic means are to be enabled, said means for reading out transferring the direct control bits stored in said memory means during said predetermined time slot to permit the indicated ones of said logic circuit means of said direct control logic means to be enabled, when said enabling signal is provided by said enable means during said predetermined time slot so as not to interfere with the operation of the register junctor means transferring information.

2. A maintenance control arrangement as set forth in claim 1 wherein said logic circuit means of said direct control logic means includes a plurality of latch circuits and a plurality of pulse gate circuits.

3. A maintenance control arrangement as set forth in claim 2 wherein said central processor means provides a first control pulse directive for effecting the setting of one or more of said latch circuits and a second control pulse directive for effecting the enabling of one or more of said pulse gate circuits.

4. A maintenance control arrangement as set forth in claim 1 wherein said enable means includes enable latch circuit means and enable gate means, said enable latch circuit means being set by a control pulse directive provided by said central processor prior to said predetermined time slot for providing an enabling input to said enabling gate means, said enabling gate means being enabled during said predetermined time slot.

5. A maintenance control arrangement as set forth in claim 1 wherein said central processor means is operable to effect the storing of said direct control bits in said memory means prior to said predetermined time slot to enable an indicated logic circuit means of said direct control logic means to be enabled.

6. In a communication switching system including a data processing unit having a central processor means and a register-sender means including memory means and register junctor means arranged on a time division multiplex basis for transferring information to said memory means during recurring pulses generated by a clock source, said pulses each defining a different time slot under the control of a register multiplex unit, and a data bus connected between said central processor means and said register-sender means, a maintenance control arrangement including direct control logic means having a plurality of logic circuit means, certain of said logic circuit means being individually connected to said register junctor means, for controlling said register junctor means, said direct control logic means including enable means connected to said clock source and responsive to a control pulse directive transmitted to said maintenance means over said data bus from said central processor means to enable said logic circuit means of said direct control logic means, said memory means storing data for permitting selective enabling of said logic circuit means of said direct control logic means, and means for permitting the selective enabling of said logic circuit means of said direct control logic means in response to the altering of said data by said central processor means.

7. In a data handling system including a first subsystem having memory means for storing information therein, circuit means for reading the information therefrom, a plurality of units for transferring said information to said memory means for storage therein, a source of recurring pulses each defining a different time slot, multiplexing means for permitting said units to share said memory means on a time division multiplex basis during certain ones of said recurring pulses, a second subsystem for supplying control pulses to said first subsystem for control purposes, said memory means having a separate control pulse storage location for storing said control pulses therein, means responsive to said control pulses from said second subsystem for transferring said control pulses to said control pulse storage location for storage therein, logic means coupled to said source for sensing a predetermined one of said recurring pulses following all of said certain ones of said recurring pulses, said circuit means being responsive to said logic means for reading out said control pulses from said memory means during said predetermined one of said recurring pulses, and a plurality of control logic devices responsive to said circuit means for controlling different operations of said first subsystem in response to said control pulses being read from said memory means during said predetermined one of said recurring pulses so as not to interfere with the operation of the units supplying information to said memory means during said certain ones of recurring pulses.

* * * * *